US012142415B2

(12) United States Patent
Inui et al.

(10) Patent No.: US 12,142,415 B2
(45) Date of Patent: Nov. 12, 2024

(54) COIL DEVICE

(71) Applicant: TDK CORPORATION, Tokyo (JP)

(72) Inventors: Kyosuke Inui, Tokyo (JP); Yuichi Oyanagi, Tokyo (JP); Toru Tonogai, Tokyo (JP); Toshiyuki Anbo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 541 days.

(21) Appl. No.: 17/512,790

(22) Filed: Oct. 28, 2021

(65) Prior Publication Data

US 2022/0139609 A1 May 5, 2022

(30) Foreign Application Priority Data

Nov. 5, 2020 (JP) ................................ 2020-185212

(51) Int. Cl.
*H01F 5/00* (2006.01)
*H01F 17/04* (2006.01)
*H01F 27/29* (2006.01)

(52) U.S. Cl.
CPC ........... *H01F 27/292* (2013.01); *H01F 17/04* (2013.01); *H01F 2017/048* (2013.01)

(58) Field of Classification Search
CPC .................................................... H01F 27/292
USPC ........................................................ 336/200
See application file for complete search history.

(56) References Cited

U.S. PATENT DOCUMENTS

2013/0255071 A1* 10/2013 Muneuchi ............. H01F 27/292 29/605
2014/0338185 A1 11/2014 Muneuchi et al.
2015/0048915 A1* 2/2015 Yoon .................. H01F 17/0013 336/192
2019/0244749 A1 8/2019 Adachi et al.
2020/0335264 A1 10/2020 Tonogai et al.
2021/0027932 A1* 1/2021 Kang .................... H01F 27/292
2021/0272740 A1* 9/2021 Wakabayashi ...... H01F 27/2804

FOREIGN PATENT DOCUMENTS

CN 111834104 A 10/2020
JP 2008-042068 A 2/2008
JP 2013-069713 A 4/2013
JP 2013-211333 A 10/2013
JP 2014225590 A 12/2014
WO 2018/116665 A1 6/2018

* cited by examiner

*Primary Examiner* — Ronald Hinson
(74) *Attorney, Agent, or Firm* — Oliff PLC

(57) ABSTRACT

A coil device including: a core containing magnetic particles and a resin component; a coil including a conductor having a coil shape; and a terminal electrode formed on a part of an outer surface of the core and electrically connected to an end of the conductor drawn from the coil. The terminal electrode includes a first electrode layer in contact with the end of the conductor and a second electrode layer located outside the first electrode layer. The first electrode layer and the second electrode layer both include conductive powder and resin, and a content of the resin in the second electrode layer is higher than a content of the resin in the first electrode layer.

7 Claims, 9 Drawing Sheets

COIL DEVICE

BACKGROUND OF THE INVENTION

1. Field of the Invention

The invention relates to a coil device including a terminal electrode.

2. Description of the Related Art

As a type of electronic component, a coil device, in which a terminal electrode (sometimes called an external electrode) is formed on the outer surface of an element body (core), is known. In the manufacturing process of this coil device, it is required to form the terminal electrode at a temperature as low as possible to reduce a thermal influence on the element body.

In response to such request, Patent Document 1 discloses a technique for forming a terminal electrode using a conductive paste including metal fine grains. The conductive paste of Patent Document 1 can be sintered at a low temperature of 250° C. or lower, and terminal electrodes can be formed without deteriorating the organic component included in the element body. On the other hand, the terminal electrodes formed by the above technique have poor resistance to acid or impact, and the connection reliability is not always sufficient.

[Patent Document 1] Japanese Unexamined Patent Application 2013-211333

SUMMARY OF THE INVENTION

The invention has been made in view of such circumstances, and an object of the invention is to provide a coil device having a terminal electrode with a high connection reliability.

To achieve the above object, a coil device of the invention includes:

- a core containing magnetic particles and a resin component;
- a coil including a conductor having a coil shape; and
- a terminal electrode formed on a part of an outer surface of the core and electrically connected to an end of the conductor drawn from the coil; in which
- the terminal electrode includes a first electrode layer in contact with the end of the conductor and a second electrode layer located outside the first electrode layer,
- both the first electrode layer and the second electrode layer include conductive powder and resin, and
- a content of the resin in the second electrode layer is higher than a content of the resin in the first electrode layer.

In the coil device of the invention, multiple resin electrodes having different amounts of resin are laminated on the part of the outer surface of the core, which is the element body. More specifically, the first electrode layer including a low amount of resin and having a small resistance value exists on a side contacting the end of the conductor extracted from the coil, and the second electrode layer including a high amount of resin is laminated on the first electrode layer. When the terminal electrode has the above structure, the adhesion strength of the terminal electrode to the core is improved, and the connection reliability of the terminal electrode becomes preferable. In particular, since the second electrode layer having a large amount of resin is laminated to protect the first electrode layer having a low resistance value, the acid resistance and impact resistance of the terminal electrodes are improved, which contributes to the improvement of connection reliability.

The conductive powder in the first electrode layer preferably includes

- metal nano-particles having a particle size of at least 100 nm or less and
- metal micro-particles having a particle size larger than the particle size of the metal nano-particles.

By having the above properties, the resistance value of the first electrode layer becomes lower, and the electrical properties of the terminal electrode are further improved.

Preferably, the average thickness of the second electrode layer is thicker than the same of the first electrode layer. Thus, the impact resistance of the terminal electrode is further improved, and the connection reliability is further improved.

Preferably, outer resin electrode layers are laminated in the second electrode layer. Thus, the impact resistance of the terminal electrode is further improved.

According to the present disclosure, the first electrode layer may be completely covered by the second electrode layer. In this case, the acid resistance and impact resistance of the terminal electrode become preferable. The laminated structure of the first electrode layer and the second electrode layer is not limited to the above-mentioned form, and may have the following properties.

A non-overlapping part may be existed at an end of the terminal electrode where a part of the first electrode layer is not covered with the second electrode layer. The non-overlapping part is present only in a part of the terminal electrodes. Thus, the resistance value of the terminal electrodes can be further lowered while ensuring acid resistance and impact resistance.

A part of the first electrode layer may be partially extracted toward an outer surface side of the second electrode. Thus, the resistance value of the terminal electrode can be further lowered while ensuring acid resistance and impact resistance.

The present disclosure can be applied to coil devices such as inductors, transformers, choke coils, and common mode filters, and is particularly suitable for coil device, in which an insulating coated coil, resin, or the like is contained inside the element body.

DESCRIPTION OF THE EMBODIMENTS

Figure 1:
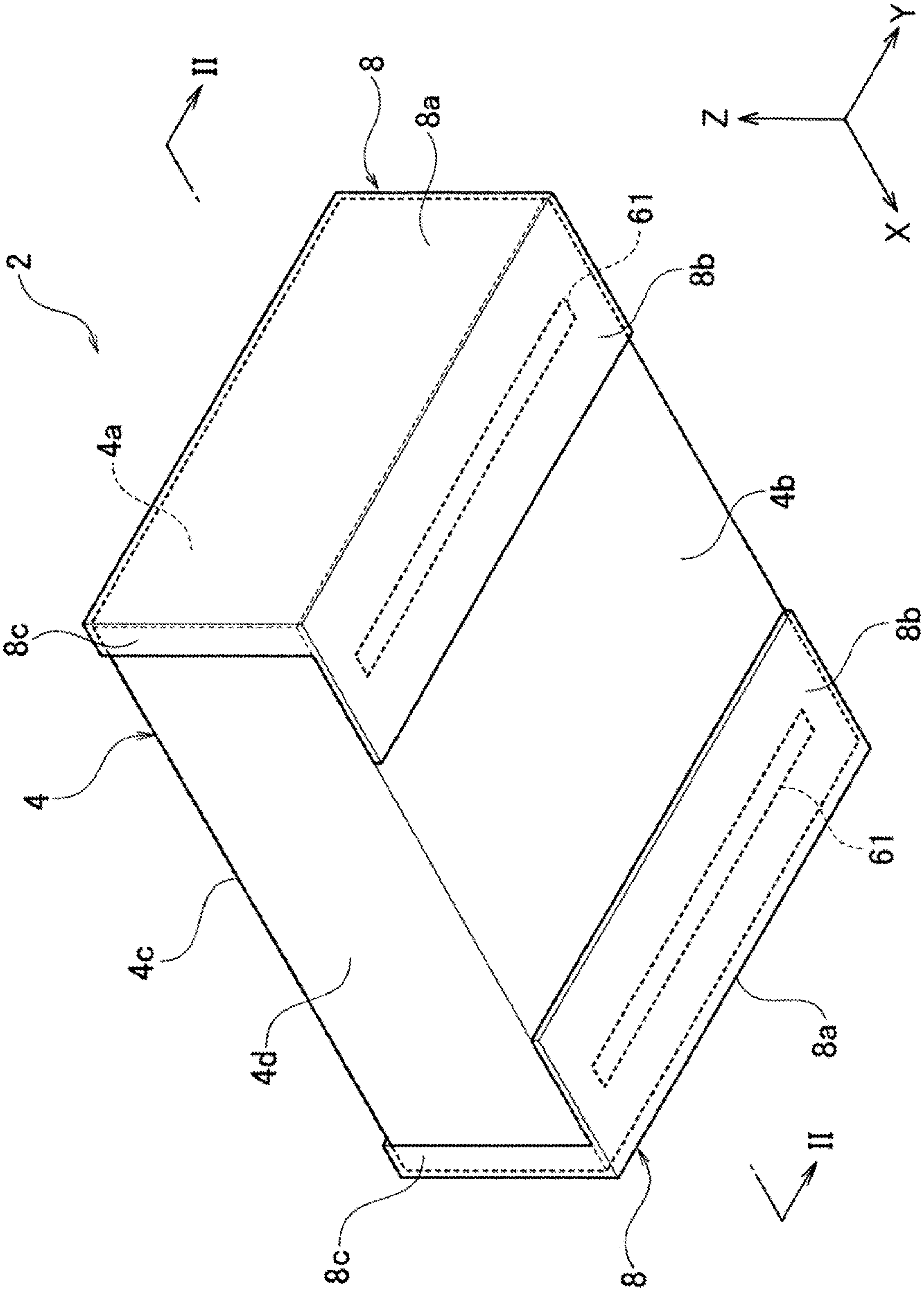
FIG. 1 is a perspective view of the coil device according to an embodiment of the application as viewed from the bottom surface side.

Hereinafter, the present disclosure will be described based on the embodiments shown in the drawings.

The First Embodiment

As shown in FIG. 1, the inductor 2 as the coil device according to an embodiment of the present application has a substantially rectangular parallelepiped shaped (substantially hexahedral shaped) element body 4.

The element body 4 has a pair of end faces 4*a* substantially perpendicular to the X-axis, a bottom face 4*b* substantially perpendicular to the Z-axis, an upper face 4*c* located on the opposite side of the bottom face 4*b* in the Z-axis direction, and a pair of side faces 4*d* substantially perpendicular to the Y-axis. The dimensions of the element body 4 are not particularly limited. For example, the dimension of the element body 4 in the X-axis direction can be 1.2 to 6.5 mm, the dimension in the Y-axis direction can be 0.6 to 6.5 mm, and the dimension in the Z-axis direction, the height, can be 0.5 to 5.0 mm. The X-axis, Y-axis, and Z-axis are mutually perpendicular according to this embodiment.

According to this embodiment, the element body 4 is a dust core including magnetic particles and a resin component.

The magnetic particles may be composed of ferrite such as Mn—Zn based ferrite or Ni—Zn-based ferrite. The magnetic particles are preferably metal magnetic particles, and more preferably soft magnetic metal particles. Examples of the soft magnetic metal particles include Fe—Ni alloys, Fe—Si alloys, Fe—Co alloys, Fe—Si—Cr alloys, Fe—Si—Al alloys, amorphous alloys including Fe, nano-crystalline alloys including Fe, and the like. A sub-component may be added to the magnetic particles as appropriate.

Further, when the magnetic particles are metal particles as described above, it is preferable that metal particles adjacent to each other in the dust core are insulated from each other. Examples of the insulating method include a method of forming an insulating film on the particle surface. Examples of the insulating film include a film formed of a resin or an inorganic material and an oxide layer formed by oxidizing the particle surface by heat treatment or the like. When forming the insulating film with a resin or an inorganic material, examples of the resin include silicone resin and epoxy resin, and examples of the inorganic material include phosphates, such as magnesium phosphate, calcium phosphate, zinc phosphate and manganese phosphate, silicates (water glass) such as sodium silicate, soda coal glass, borosilicate glass, lead glass, aluminosilicate glass, borate glass, and sulfate glass. The thickness of the insulating film is not particularly limited, for example, it is preferably 5 nm to 20 nm. The insulating property among particles can be improved and voltage resistance of the inductor 2 can be improved by forming the insulating film.

The particle size of the magnetic particles included in the element body 4 is not particularly limited, for example, the median diameter (D50) may be in the range of 1 μm to 50 μm. Further, the magnetic particles may be formed by mixing multiple particle groups each having different particle size. For example, the magnetic particles included in the element body 4 may be a mixture of large particles having D50 of 20 μm to 30 μm, medium particles having D50 of 1 μm to 5 μm, and small particles having D50 of 0.3 μm to 0.9 μm. Alternatively, in addition to the mixture of the three particle groups as described above, it may be a mixture of large particles and medium particles, a mixture of large particles and small particles, a mixture of medium particles and small particles, and the like.

By forming the magnetic particles in multiple particle groups as described above, a packing rate of the magnetic particles included in the element body 4 can be increased. As a result, various properties of the inductor 2 such as permeability, eddy current loss, DC bias characteristic and the like can be improved. In the above case, the large particles, the medium particles, and the small particles may all be made of the same kind of material, or may be made of different materials. The particle size of the magnetic particles can be measured by observing a cross section of the element body 4 with such as a scanning electron microscope (SEM) or a scanning transmission electron microscope (STEM), and image analyzing the obtained cross sectional photograph with software. At that time, it is preferable to measure the particle size of the magnetic particles in terms of a circle equivalent diameter.

The magnetic particles having the above properties are dispersed in the resin component inside the element body 4. The resin component included in the element body 4 is not particularly limited, and it may be a thermosetting resin, such as an epoxy resin, a phenol resin, a melamine resin, an urea resin, a furan resin, an alkyd resin, a polyester resin, and a diallyl phthalate resin, or a thermoplastic resin, such as an acrylic resin, polyphenylene sulfide (PPS), polypropylene (PP), and a liquid crystal polymer (LCP). The resin component may include additives such as sub-components as appropriate.

Figure 2:
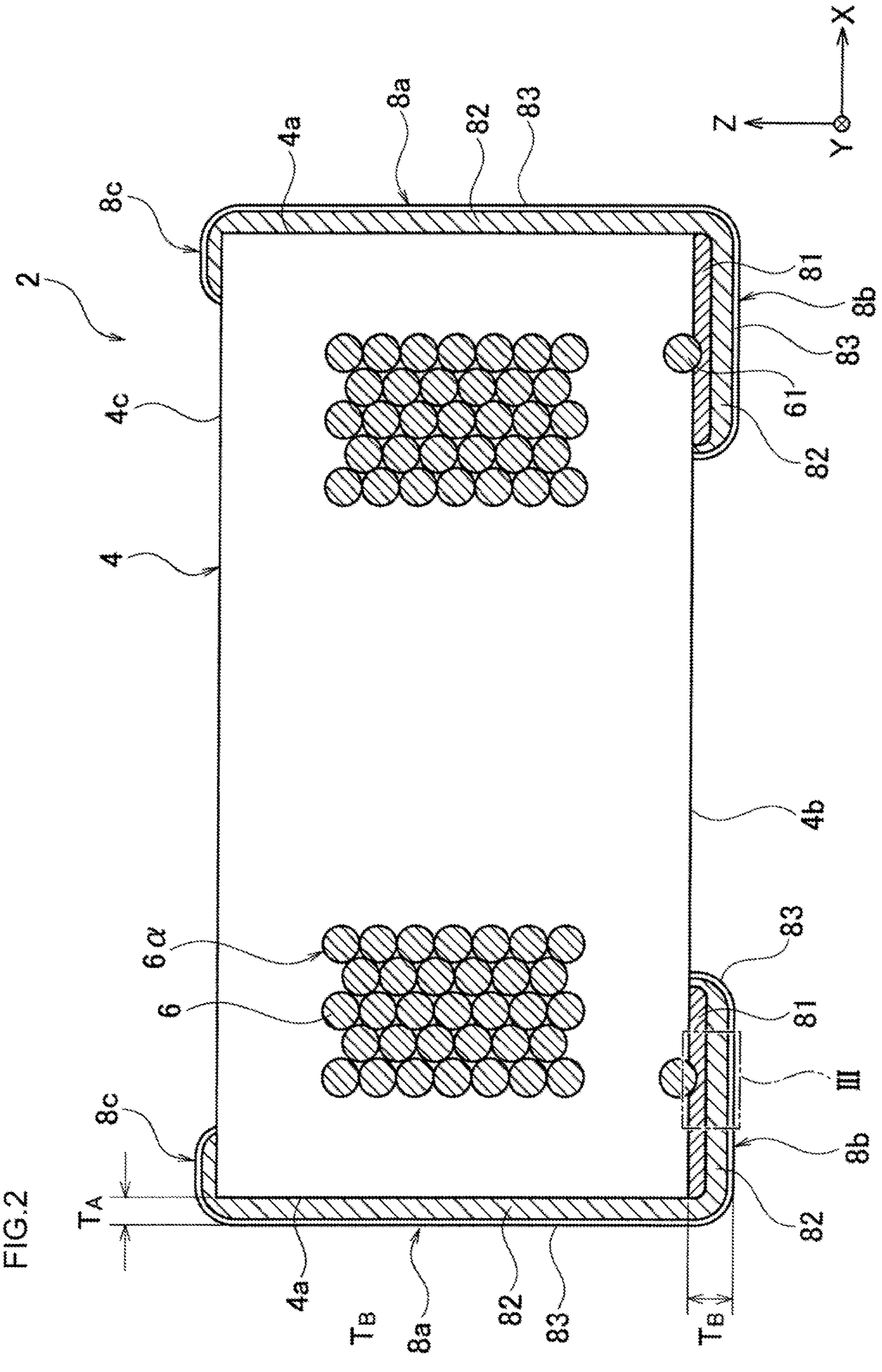
FIG. 2 is a cross-sectional view along line II-II shown in FIG. 1.

Further, as shown in FIG. 2, a coil 6*a* is embedded inside the element body 4. The coil 6*a* is formed by winding a wire 6 in a coil shape as a conductor. In this embodiment, the wire 6 is wound by a general normalwise method, however, the winding method of the wire 6 is not limited, and for example, it may be α-wound or edgewise wound.

The wire 6 constituting the coil 6*a* includes a wire body 6*a* mainly including copper, and an insulating layer 6*b* covering the outer periphery of the wire body 6*a*. More specifically, the wire body 6*a* includes a pure copper such as an oxygen-free copper or a tough pitch copper, a copper-coated steel, or an alloy such as phosphorus bronze, brass, tan copper, beryllium copper, or silver-copper alloy. On the other hand, the insulating layer 6*b* is not particularly limited if it has an electrical insulating property. An epoxy resin, an acrylic resin, a polyurethane, a polyimide, a polyamide-imide, a polyester, a nylon, a polyester and the like, or a synthetic resin obtained by mixing at least two of the above resins is exemplified as the insulating layer 6*b*. According to this embodiment, as shown in FIG. 2, the wire 6 is a round wire, and the cross-sectional shape of the conductor is a circular shape.

A pair of extracting electrodes 61 are present on the bottom face 4*b* of the element body 4. The extracting electrode 61 extends along the Y-axis, and is formed by exposing the end of the wire 6 extracted from the coil 6*a* to outside of the bottom face 4*b*. More specifically, at the extracting electrodes 61, the insulating layer 6*b* of the wire 6 extracted out to the bottom face 4*b* is peeled off, and the wire body 6*a* is exposed to the outside of the bottom face 4*b*. In the inductor 2 of this embodiment, a pair of end face electrodes 8 is formed on the outer surface of the element body 4 to cover the extracting electrode 61, and the extracting electrode 61 and the terminal electrode 8 are electrically connected.

As shown in FIGS. 1 and 2, a pair of terminal electrodes 8 respectively includes an end face electrode 8*a*, a bottom face electrode 8*b*, and a wraparound part 8*c*, and the above parts are integrally connected. The pair of terminal electrodes 8 are separated from each other in the X-axis direction and are mutually insulated.

The end face electrode 8*a* covers one of the end faces 4*a* and is connected to the bottom face electrode 8*b* at the lower end in the Z-axis direction. The bottom face electrode 8*b* is formed on a part of the bottom face 4*b* to completely cover one of the extracting electrodes 61, and is electrically connected to the extracting electrode 61. The wraparound part 8*c* exists in a part of the upper face 4*c* and a part of the side face 4*d*. The wraparound part 8*c* is formed by the conductive paste wrapping around a part of the upper face 4*c* and a part of the side face 4*d* from the end face 4*a*, in which the conductive paste used for forming the end face electrode 8*a*. Note that, the wraparound part 8*c* is not essential and may not be formed depending on the method of forming the terminal electrode 8.

In the inductor 2 of this embodiment, as described above, the element body 4 includes organic components such as the resin component and the insulating layer 6*b* of the wire 6. If a heat treatment is performed at a high temperature (500° C. or higher) to form the terminal electrode 8 in such inductor 2, the organic components in the element body 4 are deteriorated (decomposed/burned). Therefore, it is difficult to adopt a sintered electrode including an inorganic binder such as glass frit as the terminal electrode 8. Therefore, according to this embodiment, the terminal electrode 8 includes multiple resin electrodes (first electrode layer 81 and second electrode layer 82) and an outermost layer 83.

Figure 3A:
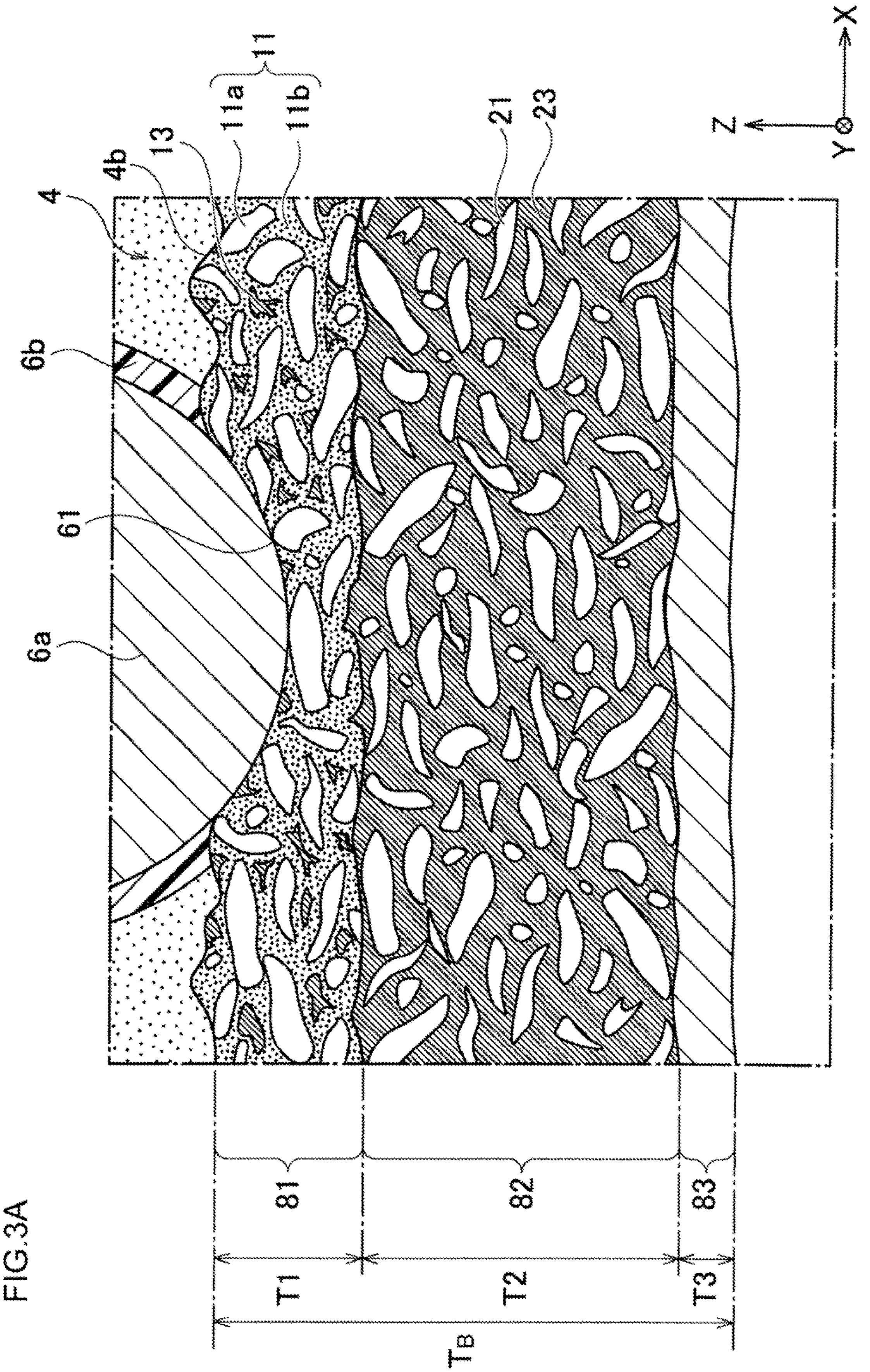
FIG. 3A is an enlarged cross-sectional view of a main part of the area III shown in FIG. 2.
Figure 3B:
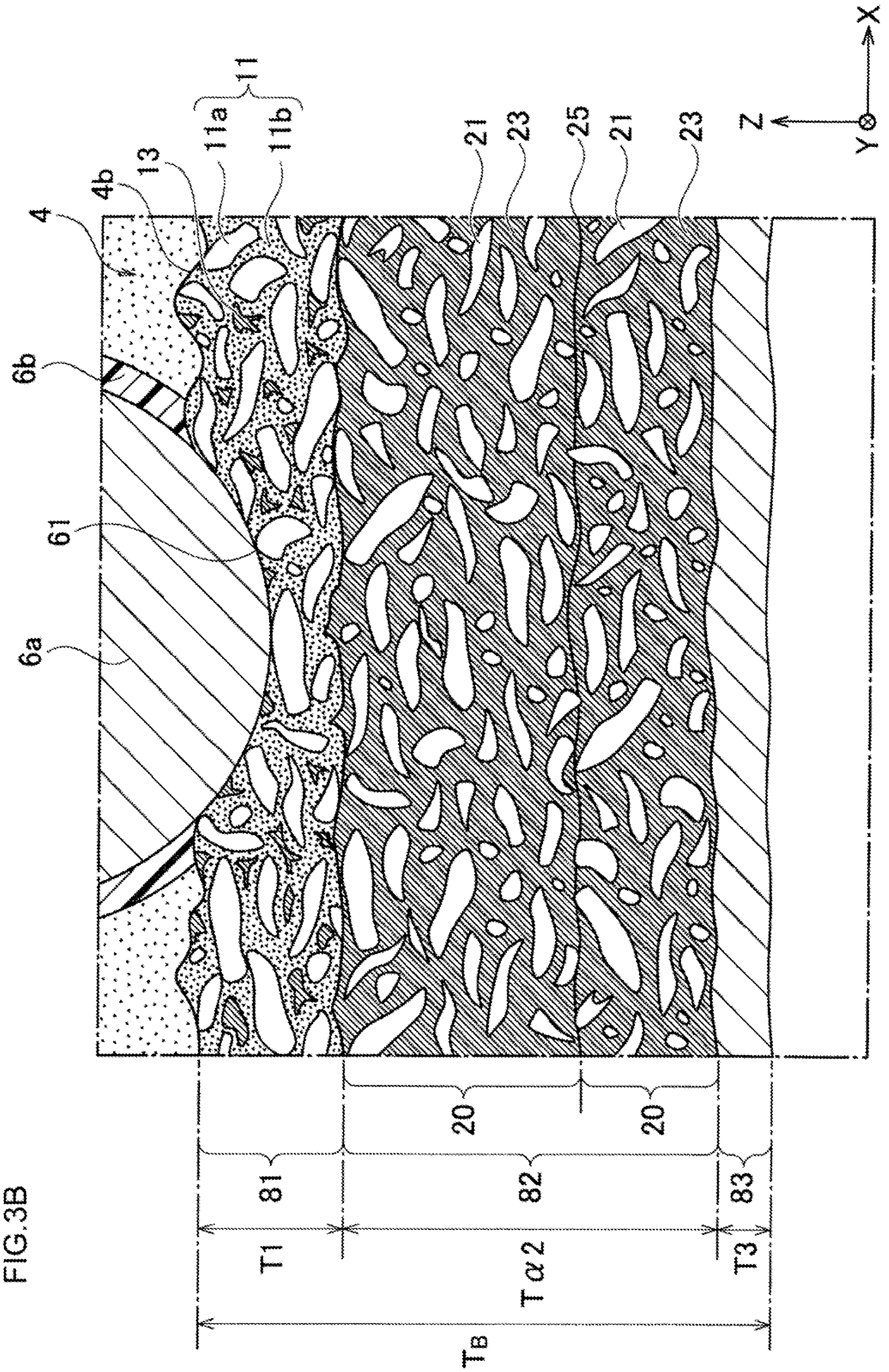
FIG. 3B is a cross-sectional view of the main part showing a modified example of the terminal electrode shown in FIG. 3A.

More specifically, at the bottom face electrode 8*b* of the terminal electrode 8, a first electrode layer 81 is formed as a base electrode in contact with the bottom face 4*b*. The first electrode layer 81 completely covers a extracting electrode 61, and directly connected to the extracting electrode 61. Then, at the bottom face electrode 8*b*, a second electrode layer 82 is laminated on the first electrode layer 81 to be in contact with the outer surface of the first electrode layer 81. The second electrode layer 82 is a resin electrode having a higher resin content than that of the first electrode layer 81, and may be formed of a single layer as shown in FIG. 3A or multiple layers as shown in FIG. 3B.

In the meantime, the first electrode layer 81 is not formed at the end face electrode 8*a* and at the wraparound part 8*c* of the terminal electrode 8, but the second electrode layer 82 is formed to be in direct contact with the outer surface of the element body 4. The second electrode layer 82 of the end face electrode 8*a* and the wraparound part 8*c* may also be a single layer or multiple layers. The outermost layer 83 is located at the outermost surface side of the terminal electrode 8, and covers the second electrode layer 82 at each part of the end face electrode 8*a*, the bottom face electrode 8*b*, and the wraparound 8*c*. According to this embodiment, the second electrode layer 82 completely covers the first electrode layer 81, and the first electrode layer 81 is not exposed on the outer surface of the second electrode layer 82.

Next, the properties of each electrode layer constituting the terminal electrode 8 will be described with reference to FIG. 3A.

First, the first electrode layer 81 is a resin electrode including a conductor powder 11 and a resin 13, and in addition, the first electrode layer 81 may include voids, an inorganic material, or the like. The resin 13 of the first electrode layer 81 is a thermosetting resin such as an epoxy resin, a phenol resin, or the like. On the other hand, the conductor powder 11 of the first electrode layer 81 is a metal powder such as Ag, Au, Pd, Pt, Ni, Cu, Sn, or an alloy powder including at least one of the above elements. It is particularly preferable that the conductor powder 11 includes Ag as a main component.

Further, according to this embodiment, the conductor powder 11 of the first electrode layer 81 preferably includes two kinds of particle groups (first particles 11*a* and second particles 11*b*) having different particle size distributions.

The first particles 11*a* have a micrometer order particle size. "Micrometer-order particles" means particles having a particle size of more than 0.1 μm and several tens of μm or less. The first particles 11*a* of this embodiment preferably have an average particle size of 1 μm to 10 μm, and more preferably 3 μm to 5 μm, in the cross section as shown in FIG. 3.

Further, the shape of the first particles 11*a* may be a shape close to a sphere, a long sphere, an irregular block shape, a needle shape, or a flat shape, and in particular, the needle shape or the flat shape is preferable. More specifically, in the cross section as shown in FIG. 3, the aspect ratios of the first particles 11*a* are preferably within the range of 2 to 30, in which the aspect ratio is a ratio of the length in the longitudinal direction to width in the lateral direction. The particle size distribution and aspect ratio of the first particles 11*a* can be measured by observing the cross section of the first electrode layer 81 with SEM or STEM, then analyzing the obtained cross sectional photograph by image analysis. Note that, the average particle size of the first particles 11*a* is calculated in terms of maximum length.

On the other hand, the second particles 11*b* are a group of nanometer order particles having an average particle size smaller than that of the first particles 11*a*. The second particles 11*b* exist in an aggregated state at the vicinity of the outer periphery of the first particles 11*a* and among the first particles 11*a*. When the aggregated second particles 11*b* are magnified and observed by STEM, the aggregated second particles 11*b* can be recognized as an aggregate of fine particles having a particle size of at least 100 nm or less.

Both the first particles 11*a* and the second particles 11*b* in the first electrode layer 81 are preferably Ag particles. However, the metal element as the main component may be different between the first particles 11*a* and the second particles 11*b*.

In the first electrode layer 81 having the above structure, the second particles 11*b* on the order of nanometers are filled among the first particles 11*a*, and are also filled at a bonding interface between the extracting electrodes 61 and the first electrode layer 81. As a result, the electrical connection at among particles and the bonding interface is improved, and the contact resistance of the terminal electrode 8 with respect to the extracting electrodes 61 can be reduced.

On the other hand, the second electrode layer 82 is a resin electrode including the conductor powder 21 and the resin 23. In addition to the above, the second electrode layer 82 may include voids, an inorganic material, or the like. The resin 23 of the second electrode layer 82, similarly to the first electrode layer 81, may include a thermosetting resin such as an epoxy resin or a phenol resin. Further, the conductor powder 21 of the second electrode layer 82, similarly to the first electrode layer 81, is a metal powder such as Ag, Au, Pd, Pt, Ni, Cu, Sn, or a an alloy powder including at least one of the above elements, and is particularly preferable to include Ag as a main component.

It is preferable that the conductor powder 21 of the second electrode layer 82 only includes micrometer order metal particles without including nanometer order fine particles.

Specifically, the conductor powder 21 of the second electrode layer 82 preferably has an average particle size of 1 μm to 10 μm, and more preferably 3 μm to 5 μm in the cross section as shown in FIG. 3. Further, the particle shape of the conductor powder 21 may be a shape close to a sphere, a long sphere, an irregular block shape, a needle shape, or a flat shape, and in particular, the needle shape or the flat shape is preferable. Further, the aspect ratio of each particle constituting the conductor powder 21 is preferably within the range of 2 to 30. The material, particle size, and particle shape of the conductor powder 21 in the second electrode layer 82 may be the same or different from that of the first particles 11*a*.

As shown in FIG. 3B, the second electrode layer 82 may be formed by laminating outer resin electrode layers 20. In this case, a number of the outer resin electrode layers 20 is not particularly limited, but may be 2 to 3 layers are preferable. A boundary line 25 is formed between each of the outer resin electrode layers 20 by recoating the raw material paste. This boundary line 25 may be observed continuously or intermittently.

When the second electrode layer 82 is formed of multiple layers, each outer resin electrode layer 20 may have different resin contents, however, each outer resin electrode layers 20 have a higher resin content than the first electrode layer 81. Further, the material of the conductor powder 21 and the material of the resin 23 may be different in each outer resin electrode layer 20. However, from the viewpoint of manufacturing efficiencies, it is preferable that each outer resin electrode layer 20 is manufactured using the same raw material paste, and that the resin content, the material and shape of the conductor powder 21, and the material of the resin 23 are the same.

As described above, according to this embodiment, multiple resin electrodes are laminated on the bottom face electrode 8*b*, and the content rates of the resins in the first electrode layer 81 is different from the same in the second electrode layer 82. Specifically, the content rate R2 of the resin 23 in the second electrode layer 82 is higher than the content rate R1 of the resin 13 in the first electrode layer 81, and R2/R1 is preferably 2.0 to 10.0, and more preferably 3.0 to 5.0.

The resin content (R1, R2) in each electrode layer can be expressed as a ratio of the area occupied by the nonmetallic component in the cross section of each electrode layer. Specifically, when the cross section of each electrode layer (81, 82) is observed by SEM reflected electron image or STEM HAADF image, the conductor powder (11, 21) including the metal component can be recognized as bright contrast areas, and the nonmetallic components including the resin (13, 23) and voids can be recognized as dark contrast areas. Therefore, an area ratio $A_M$ occupied by the conductor powder and an area ratio $A_R$ occupied by the nonmetallic component in the cross section can be calculated by binarizing the cross sectional photograph taken by SEM or STEM image analysis.

Area ratio $A_R$ occupied by the nonmetallic component may include the areas of the voids, in addition to the areas of the resin. It is extremely difficult to clearly distinguish the resin from the void in the cross-sectional photograph, and it is not easy to accurately calculate only the area occupied by the resin. On the other hand, there is a clear positive correlation between the resin content (R1, R2) and the area ratio $A_R$ occupied by the nonmetallic component. Thus, the amount of the resin content (R1, R2) can be expressed by the area ratio $A_R$ occupied by the nonmetallic component. Therefore, the ratio of R2 to R1 (R2/R1) is expressed as the ratio of $A_R2$ to $A_R1$ ($A_R2/A_R1$), in which $A_R1$ is an area ratio of the nonmetallic components in the cross section of the first electrode layer 81 and $A_R2$ is an area ratio of the nonmetallic components in the cross section of the second electrode layer 82.

In this embodiment, $A_R2/A_R1$ (that is R2/R1) is preferably 2.0 to 10.0, and more preferably 3.0 to 5.0. In addition, $A_R1$ is preferably 5.0% to 18.0%, and more preferably 9.0% to 13.0%. As described above, the resin content of the first electrode layer 81 is lower than that of the second electrode layer 82, and the resistance value of the first electrode layer 81 is lower than that of the second electrode layer 82. On the other hand, the resin content of the second electrode layer 82 is higher than that of the first electrode layer 81. Thus, the second electrode layer 82 is possible to soften stress and impact from outside. In addition, the conductor powder 21 is unlikely to flow out into the solution when a surface of the second electrode layer 82 is exposed to an etching solution or a plating solution. That is, the second electrode layer 82 has better resistance to acid than the first electrode layer 81.

Further, in the cross section of the first electrode layer 81, a ratio of $A_M1a$ with respect to $A_M1b$ ($A_M1a/A_M1b$) is preferably 1.5 to 6.0, and more preferably 2.0 to 4.0, in which $A_M1a$ is an area ratio occupied by the first particles 11*a* and $A_M1b$ is an area ratio occupied by the second particles 11*b*. Since the content ratios of the first particles 11*a* and the second particles 11*b* in the first electrode layer 81 satisfy the above conditions, the resistance of the first electrode layer 81 is further reduced, and the adhesion strength of the first electrode layer 81 with respect to the element body 4 tends to be improved.

The area ratios $A_M$ and $A_R$ described above are both calculated based on the cross sectional area of the electrode layers, i.e., the area of the observation field area, and $A_M+A_R=100\%$ ($A_M1a+A_M1b+A_R1=100\%$ in case of the first electrode layer 81, and $A_M2+A_R2=100\%$ in the case of the second electrode layer 82). Further, it is preferable that each area ratio $A_M$, $A_R$ is calculated as an average value obtained by performing the above-mentioned image analysis in at least 10 observation fields or more. The observation field per one view is preferably 0.04 $\mu m^2$ to 0.36 $\mu m^2$.

Further, according to this embodiment, it is preferable that the first electrode layer 81 and the second electrode layer 82 have a predetermined thickness. Specifically, the average thickness T1 of the first electrode layer 81 may be 5 μm to 30 μm, and preferably 10 μm to 20 μm. When the second electrode layer 82 is a single layer as shown in FIG. 3A, the average thickness T2 of the second electrode layer 82 is preferably thicker than the average thickness T1 of the first electrode layer 81, i.e., $1.0<T2/T1$. T2/T1 is more preferably 1.5 to 2.5, and furthermore preferably 1.8 to 2.2. The maximum thickness $T_B$ of the bottom face electrode 8*b* including the first electrode layer 81 and the second electrode layer 82 is preferably 25 μm to 70 μm, and more preferably 50 μm to 70 μm.

On the other hand, as shown in FIG. 3B, when the second electrode layer 82 has multiple layers, the thickness of the outer resin electrode layer 20 per a layer is not particularly limited. The average thickness $T_\alpha 2$ of the second electrode layer 82, formed by laminating the outer resin electrode layer 20, is preferably thicker than the average thickness T1 of the first electrode layer 81, i.e., $0<T_\alpha 2/T1$. $T_\alpha 2/T1$ is more preferably 2.0 to 9.0, and furthermore preferably 3.0 to 5.0. In case the second electrode layer 82 includes multiple layers, the maximum thickness $T_B$ of the bottom face electrode 8*b* is preferably 40 μm to 80 μm, and more preferably 50 μm to 70 μm.

The thickness (T1, T2, $T_{\alpha}2$, T3) of each electrode layer in the bottom face electrode 8*b* can be measured by image analysis of the X-Z cross section of the bottom face electrode 8*b*. In this image analysis, it is preferable that the thickness is measured in an area at least 100 μm or more away from the edge of the bottom face electrode 8*b* in the X-axis direction. Further, the thickness (T1) of the first electrode layer 81 is measured not in the bonding area with the extracting electrode 61 but in the bonding area with the bottom face 4*b* of the element body 4. More specifically, the average thickness T1 of the first electrode layer 81 is calculated by measuring at least three distances, which are perpendicular distances from a bonding interface with the bottom face 4*b* of the element body 4 to a bonding interface with the second electrode layer 82. The average thickness T2 of the second electrode layer 82 is calculated by measuring at least three perpendicular distances from the bonding interface with the first electrode layer to a bonding interface with the outermost layer 83. The average thickness T3 of the below mentioned outermost layer 83 may be calculated in the same manner as described above. The maximum thickness $T_B$ of the bottom face electrode 8*b* is the maximum value of at least three distances, obtained by measuring perpendicular distances from the bonding interface with the bottom face 4*b* of the element body 4 to the outermost surface of the bottom face electrode 8*b*.

The outermost layer 83 is preferably a plating layer that covers the surface of the terminal electrode 8. Specifically, the outermost layer 83 may include a metal such as Sn, Cu, Ni, Pt, Ag, Pd, or an alloy including at least one of the above metal elements, and may be a single layer or multiple layers. For example, the outermost layer 83 may be a multilayer structure of a Ni plating layer and a Sn plating layer. In this case, it is preferable that the Ni plating layer is in contact with the second electrode layer 82 and the Sn plating layer is located on an outermost surface side.

The average thickness T3 of the outermost layer 83 is preferably 3 μm to 20 μm. The outermost layer 83 is not always necessary depending on the usage pattern of the inductor 2, but the presence of the outermost layer 83 can improve the wettability and adhesion strength of the bonding member, such as solder, with respect to the terminal electrode 8.

Up to this point, the properties of each electrode layers existing in the bottom face electrode 8*b* have been described in detail based on FIGS. 3A and 3B. The second electrode layer 82 and the outermost layer 83 at the end face electrode 8*a* or at the wraparound part 8*c* can also be formed from the same raw material as the bottom face electrode 8*b*, and has the same properties with the bottom face electrode 8*b*. For example, the average thickness of the second electrode layer 82 at the end face electrode 8*a* may be the same or different from the average thickness T2 (or $T_{\alpha}2$) of the second electrode layer 82 at the bottom face electrode 8*b*, and it can be about 0.1 to 1.0 times T2 (or $T_{\alpha}2$). The maximum thickness $T_A$ of the terminal electrode 8*a* may be the same or different from the maximum thickness $T_B$ of the bottom face electrode 8*b*, and it can be about 0.04 to 1.0 times $T_B$.

Next, an example of the method for manufacturing the inductor 2 according to this embodiment will be described.

Figure 8:
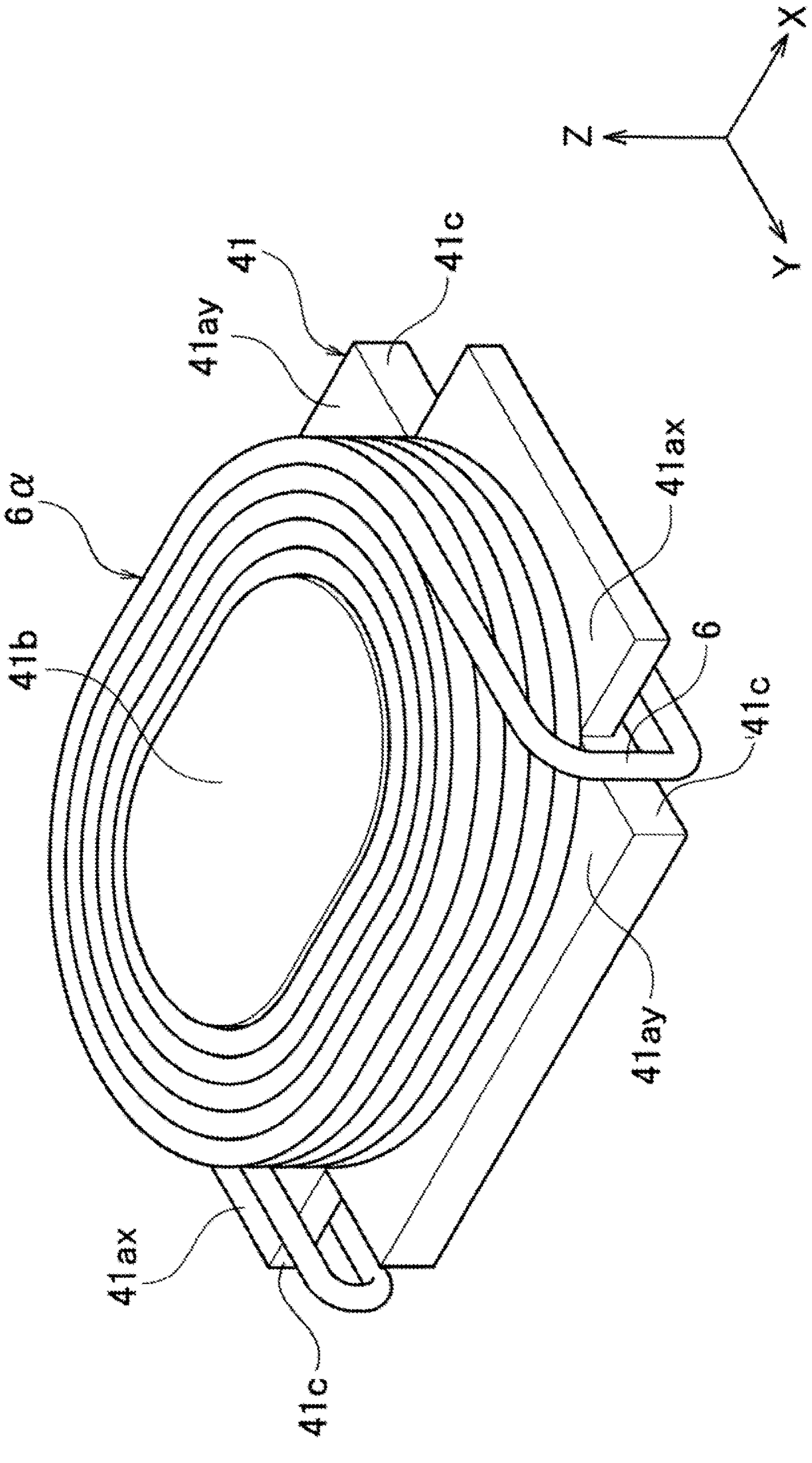
FIG. 8 is a perspective view of a preliminary green body used in the manufacturing process of the coil device.

First, the element body 4 can be manufactured by a known method for manufacturing a dust core, and the method for manufacturing the element body 4 is not particularly limited. For example, the element body 8 can be manufactured using a preliminary green body 41 as shown in FIG. 8. For manufacturing the preliminary green body 41, a raw material powder of magnetic particles is kneaded with a binder, a solvent and the like to form granules, and the granules are used as a raw material for molding. When the magnetic particles include multiple particle groups, multiple raw material powder having different particle size distributions may be prepared and mixed at a desired ratio. Then, the above granules are filled in a press mold and pressed thereof to obtain the preliminary green body 41 having the shape shown in FIG. 8.

The preliminary green body 41 has a pair of first flanges 41*ax*, a pair of second flanges 41*ay*, a winding portion 41*b*, and cutout portions 41*c*. The coil 6*a* is mounted to the preliminary green body 41. Specifically, the winding portion 41*b* has a substantially elliptical column shape protruding upward on the Z axis, and the winding portion 41*b* is inserted inside the coil 6*a*. Further, the first flange 41*ax* protrudes along the X-axis direction, the second flange 41*ay* protrudes along the Y-axis direction, and the coil 6*a* is located on the respective flanges 41*ax* and 41*by*. Each of the cutout portions 41*c* is located between the first flange 41*ax* and the second flange 41*ay* at the four corners of the X-Y plane, and the ends of the wire 6 passes through the cutout portions 41*c* and extracted to the side of the bottom face 4*b*. Further, the thickness of the first flange 41*ax* is thinner than the thickness of the second flange 41*ay*, and the end of the wire 6 extracted from the coil 6*a* is housed below the first flange 41*ax*.

After combining the preliminary green body 41 and the coil 6*a* as described above, these are installed in the press mold. Then, by introducing a magnetic paste including magnetic particles and a resin component into the press mold and injection molding thereof, a green body to be the element body 4 can be obtained. Alternatively, a green body to be the element body 4 may be obtained by laminating magnetic sheets including magnetic particles and a resin component on the preliminary green body 41 on which the coil 6*a* is mounted, and compressing thereof. The magnetic sheet has fluidity during molding. Thus, the components of the magnetic sheet are filled without gaps between the preliminary green body 41 and the coil 6*a*, inside the cutout portions 41*c*, and the like by compression. The element body 4 is obtained by appropriately applying heat treatment or the like to the green body obtained above, and curing the resin component in the green body.

Next, an electrode planned part is formed by irradiating a laser at a part of the bottom face 4*b* of the element body 4, that is, at the part where the bottom face electrode 8*b* is formed in FIG. 2. By this laser irradiation, the insulating layer 6*b* of the wire 6 extracting out to the bottom face 4*b* is removed, and the extracting electrode 61 is formed. Further, by laser irradiation, magnetic particles and resin components included in the element body are partially removed from the outermost surface (the outermost surface of the bottom face 4*b*) of the element body in the electrode planned part. The electrode planned part can also be formed by mechanical polishing, blasting treatment, chemical corrosion treatment, or the like.

Next, the bottom face electrode 8*b* is formed on the electrode planned part. The bottom face electrode 8*b* can be formed by applying a conductive paste as a raw material by a printing method such as screen printing, and then curing the resin in the paste. A first conductive paste including micro-particles and nano-particles is used as the raw material of the first electrode layer 81. The nano-particles of the first conductive paste have a particle size of at least less than 100 nm, and the nano-particles correspond to the second particles 11*b*. Further, the micro-particles of the first conductive paste correspond to the first particles 11*a* and have the properties of the first particles 11*a* as described above. The first conductive paste is printed to completely cover the extracting electrodes 61.

On the other hand, a second conductive paste including only micro-particles is used as a raw material of the second electrode layer 82. The micro-particles of the second conductive paste correspond to the conductor powder 21 and have the properties of the conductor powder 21. According to this embodiment, the second conductive paste is printed on the first conductive paste to completely cover the previously printed first conductive paste. The second electrode layer 82 shown in FIG. 3B can be formed by applying (printing) the above-mentioned second conductive paste for multiple times. Alternatively, the second electrode layer 82 shown in FIG. 3B can be formed by applying a raw material paste for the end face electrode 8*a* onto the bottom face electrode 8*b* when forming the end face electrode 8*a*.

After printing the raw material pastes by the above mentioned method, the element body 4 is heated under predetermined conditions to cure the resins (13, 23) in the raw material pastes. The conditions for the heat treatment may be appropriately determined according to the type of the used resins. For example, the treatment temperature (holding temperature) is preferably 170° C. to 230° C. and the holding time is preferably 60 min to 90 min. By performing heat treatment under such conditions, it is possible to form the bottom face electrode 8*b* without deteriorating the resin component and the insulating layer 6*b* included in the element body 4. Further, during the above heat treatment process, the resin is cured, and the nano-particles in the first conductive paste are mutually bonded while growing at among the micro-particles and the contact interface with the extracting electrodes 61. Curing treatment of the raw material paste may be carried out each time after printing each of the raw material pastes, or may be carried out collectively after printing all the raw material pastes.

Next, the second electrode layers 82 are also formed on the end faces 4*a* of the element body 4. The second electrode layer 82 on the end faces 4*a* are formed by immersing (dipping) the end faces 4*a* of the element body 4 in the second conductive paste used above. A part of the upper face 4*c* and of the side faces 4*d*, which are connected to the end faces 4*a*, are also immersed in the second conductive paste to form the wraparound part 8*c*. After being immersed in the raw material paste in this way, similar to forming the bottom face electrode 8*b*, heat treatment is performed and the resin 23 in the raw material paste is cured, and the second electrode layers 82 are also formed on the end faces 4*a*.

After forming the two types of resin electrodes (81, 82) by the above procedure, the outermost layer 83 is formed by such as a barrel plating method. The method for forming the outermost layer 83 is preferably plating, however, the method is not limited thereto, and the outermost layer 83 may be formed by a sputtering method or a deposition method.

An inductor 2 in which a pair of terminal electrodes 8 are formed on the element body 4 can be obtained by the above manufacturing method. The method for manufacturing the inductor 2 is not limited to the above method, and may be appropriately changed. For example, multiple element bodies 4 may be obtained by forming a mother green body, in which multiple coils 6*a* are embedded, and cutting thereof. The production efficiencies are improved by adopting such method.

Figure 4:
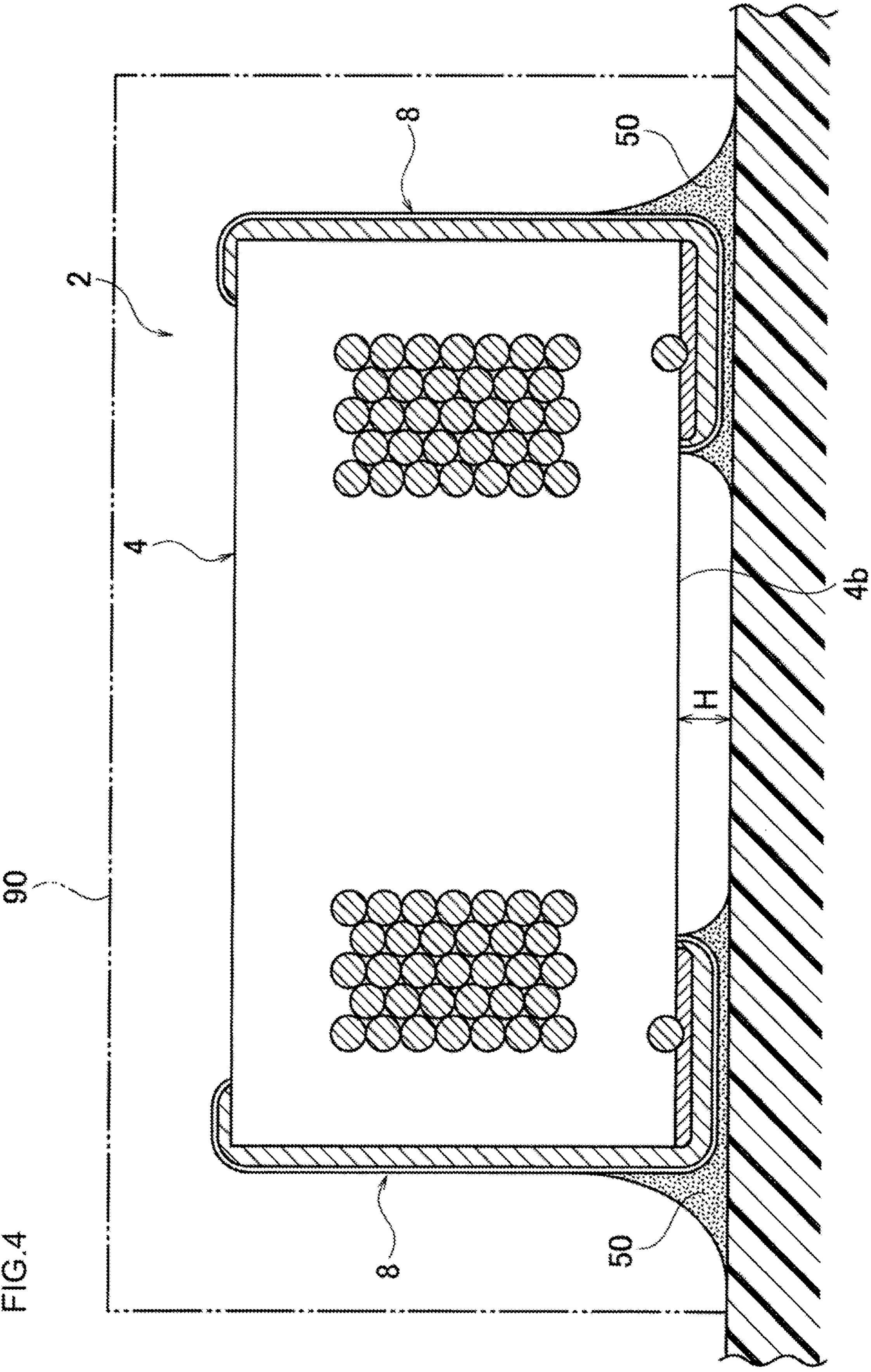
FIG. 4 is a cross-sectional view showing a mounting form of the coil device shown in FIG. 1.

Next, an example of the usage form of the inductor 2 according to this embodiment will be described. As shown in FIG. 4, the inductor 2 can be used by being surface mounted on a substrate 100 such as a circuit board.

In the surface mounting of the inductor 2, a solder paste or a conductive adhesive can be used as a bonding member 50. For example, the inductor 2 can be mounted on the substrate 100 by applying the bonding member 50 of a solder paste to a predetermined position on the surface of the substrate 100, and pressing the inductor 2 from the above. The bonding member 50 is not only interposed between the bottom face electrode 8*b* and the substrate 100, but also wets and spreads on an outer surface of the end face electrode 8*a*, and fillets are formed by the bonding member 50 outside the end face electrodes 8*a*. By forming the fillet on the end face electrode 8*a* side as above, it is possible to sufficiently secure the joint strength of the mounting part.

As shown in FIG. 4, entire of the inductor 2 may be covered with the sealing material 90, after mounting. The sealing material 90 is not particularly limited, and for example, an epoxy resin, a silicone resin, or the like can be used as the sealing material 90.

SUMMARY OF THE FIRST EMBODIMENT

In the inductor 2 of this embodiment, the terminal electrode 8 includes the first electrode layer 81 having a low resin content and low resistance, and the second electrode layer 82 having a high resin content. These resin electrodes (81, 82) can be formed at a low temperature of 250° C. or less, and can prevent the resin component and the insulating layer 6*b* included in the element body 4 from deteriorating in the process of forming the terminal electrode 8.

Conventionally, a low-temperature sintered electrode including metal fine particles is known, and the low temperature sintered electrode can also be formed at a low temperature of 250° C. or lower. The conventional low temperature sintered electrode has poor resistance to acid, and the metal components (particularly metal fine particles) in the low-temperature sintered electrode are leaked in the solution when exposed to an etching solution or a plating solution in the process of forming the plating electrode. As a result, there is a risk of lowering production efficiency and deteriorating the properties of the low-temperature sintered electrode, such as deterioration of adhesion strength, contact resistance, and so on. Further, the adhesion strength to the element body is extremely lowered if the conventional low temperature sintered electrode is formed with a thickness of 50 μm or more. Therefore, the conventional low temperature sintered electrode with a thickness of 50 μm or more is difficult to form, and is easy to peel off due to external stress or impact. In addition, it is not possible to secure a sufficient mounting height in surface mounting.

On the other hand, in the terminal electrode 8 of this embodiment, the second electrode layer 82 having a large amount of resin is formed on the first electrode layer 81 of low resistance. Thus, the metal components (11, 21) are unlikely to flow out into the solution even when the terminal electrode 8 of this embodiment is exposed to an etching solution or a plating solution. That is, the terminal electrode 8 of the embodiment exhibits an excellent acid resistance. Further, since the first electrode layer 81 of low resistance exists at the contacting position with the extracting electrodes 61, the contact resistance of the terminal electrode 8 can be lowered. Moreover, since the second electrode layer 82 is laminated on the first electrode layer 81, the adhesion strength of the terminal electrode 8 to the element body 4 can be sufficiently secured. That is, the terminal electrode 8 in this embodiment shows the contact resistance suppressed to a low level, is difficult to peel off even when it receives stress or impact from the outside, and show an excellent impact resistance. Due to the above-mentioned properties of the terminal electrode 8, the inductor 2 according to this embodiment has better connection reliability of the terminal electrode 8 than that of the conventional low temperature sintered electrode.

In particular, the first electrode layer 81 and the second electrode layer 82 are laminated on the bottom face electrode 8*b*, in which the bottom face electrode 8*b* is connected with the extracting electrode 61 and is a mounting place when surface-mounting on the substrate 100. The following effects can be obtained by forming a multilayer structure of the first electrode layer 81 and the second electrode layer 82 on the bottom face electrode 8*b*.

When a coil device, such as an inductor, is directly surface-mounted on a substrate, the terminal electrodes (particularly the terminal electrodes on the mounting surface side) may be peeled off due to such as a bending deformation of the substrate. In the inductor 2 of this embodiment, resin electrodes (81, 82) are laminated on the bottom face electrode 8*b*, and among these resin electrodes, the second electrode layer 82 particularly relieves stress and impact from the outside. Therefore, in the inductor 2 of the embodiment, even if an external force such as bending deformation of the substrate 100 is applied to the mounting part, it is possible to effectively prevent the terminal electrodes 8 (particularly a bottom face electrode 8*b*) from peeling off from the bottom face 4*b*.

Further, according to the inductor 2 of this embodiment, the adhesion strength of the terminal electrode 8 to the element body 4 can be sufficiently secured even if the bottom face electrode 8*b* is thickened. Moreover, the adhesion strength can be further increased by making the second electrode layer 82 thick. Therefore, in the mounting state as shown in FIG. 4, the mounting height H from the bottom face 4*b* to the surface of the substrate 100 can be sufficiently secured and can be easily controlled to a suitable height. The mounting height H is not particularly limited, however, the mounting height H (50 μm or more), which is difficult to realize with the conventional low temperature sintered electrode, can be easily realized by the inductor 2 of this embodiment.

The bonding member 50 used for mounting the coil device includes a flux such as a solvent and additives, and the flux may accumulate between the bottom face 4*b* and the substrate 100 after the mounting. In the inductor 2 of this embodiment, the generated flux can be easily removed because the mounting height H can be sufficiently secured as described above. Further, as shown in FIG. 4, the entire inductor 2 may be covered with the sealing material 90 after mounting. Even in such case, since the mounting height H can be sufficiently secured, the sealing material 90 can be easily filled in the gap between the bottom face 4*b* and the substrate 100, and the inductor 2 can be sealed without interposing voids.

When the content of the resin 13 in the first electrode layer 81 is controlled within a suitable range as described above, the conductor powder 11 may be formed of micrometer order metal particles only. However, the conductor powder 11 of the first electrode layer 81 preferably has the following structure. That is, in this embodiment, the first electrode layer 81 includes the micrometer order first particles 11*a* and the second particles 11*b* having a particle size of 100 nm or less as the conductor powder 11. The second particles 11*b* are aggregated and exist at among the first particles 11*a* and at the bonding interface with the extracting electrodes 61. Due to such structure, the resistance value of the first electrode layer 81 can be made lower, and the electrical properties of the terminal electrode 8 can be further improved. Further, the adhesion strength of the terminal electrode 8, particularly the bottom face electrode 8*b*, to the element body 4 can be further increased, and the connection reliability of the terminal electrode 8 is further improved.

Further, in this embodiment, the average thickness T2 (or $T_\alpha 2$) of the second electrode layer 82 is thicker than the average thickness T1 of the first electrode layer 81, and the first electrode layer 81 and the second electrode layer 82 are formed with a predetermined thickness as described above. By controlling the thickness of each resin electrodes under a predetermined condition, the acid resistance and impact resistance of the terminal electrode 8 can be further improved, and the bonding reliability of the terminal electrode 8 is further improved.

Further, as shown in FIG. 3B, the second electrode layer 82 may be formed of multiple layers, and in this case, the impact resistance of the terminal electrode 8 can be further improved.

The Second Embodiment

In the second embodiment, a modified example of the terminal electrode 8 will be described with reference to FIGS. 5 to 7. In the second embodiment, the description of the parts common to that of the first embodiment will be omitted, and the same reference numerals will be used.

Figure 5:
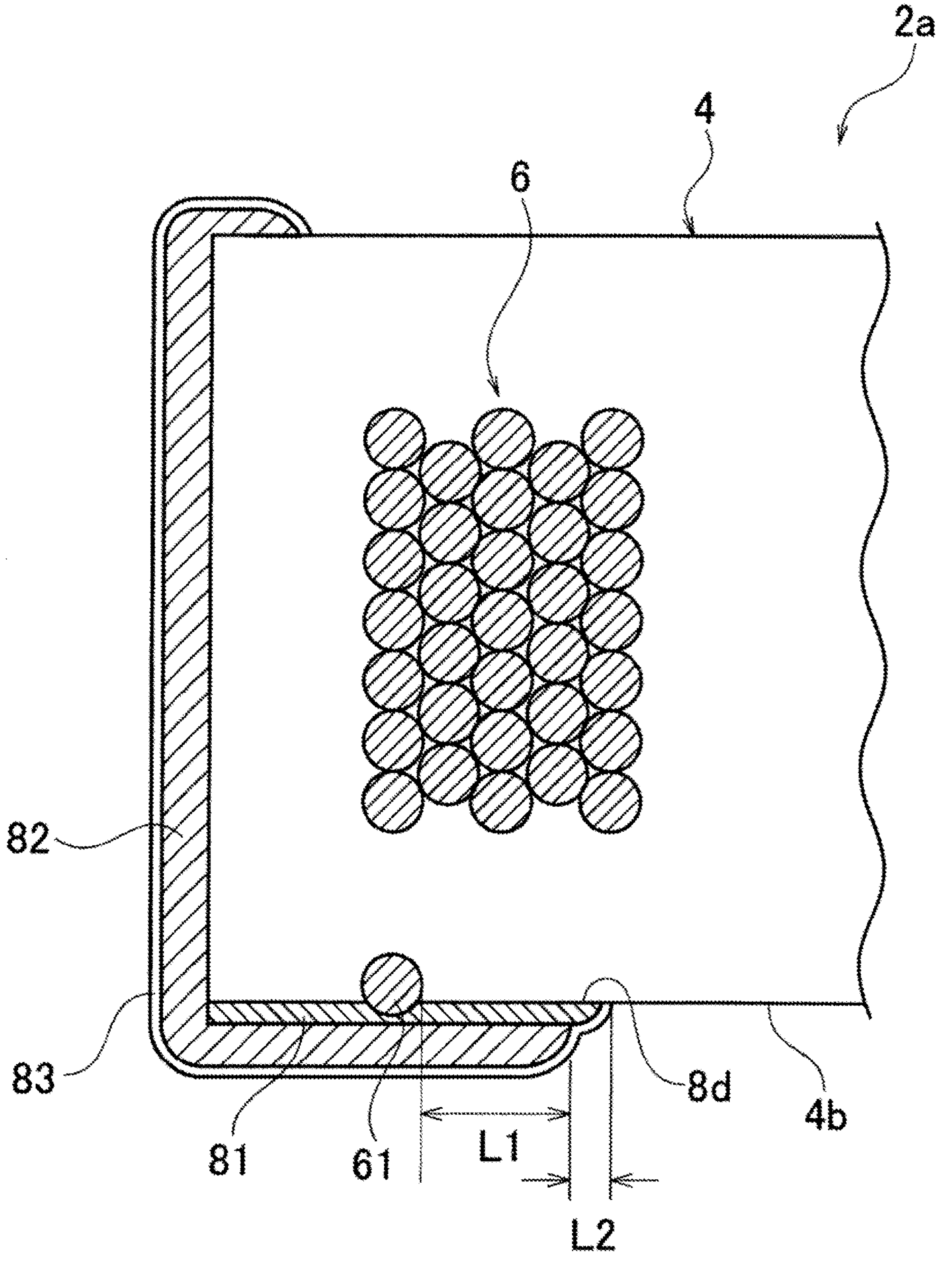
FIG. 5 is a schematic cross-sectional view showing a modified example of the coil device shown in FIG. 1.

In the inductor 2*a* shown in FIG. 5, similarly to the first embodiment, the first electrode layer 81, the second electrode layer 82, and the outermost layer 83 are laminated at the bottom face electrode 8*b*, and the second electrode layer 82 and the outermost layer 83 are laminated at the end face electrode 8*a* and at the wraparound part 8*c*. On the other hand, there is a non-overlapping part 8*d*, in which a part (tip portion) of the first electrode layer 81 is not covered with the second electrode layer 82, at an edge in the X-axis direction of the bottom face electrode 8*b* of the inductor 2*a*.

In the non-overlapping part 8*d*, the outermost layer 83 is formed on the outer surface of the first electrode layer 81 without going through the second electrode layer 82, and the outermost layer 83 and the first electrode layer 81 are in direct contact with each other and electrically connected. Therefore, in the inductor 2*a*, the contact resistance of the terminal electrode 8 can be made lower.

The non-overlapping part 8*d* exists at a place separated by a predetermined distance L1 in the X-axis direction from the contact part of the extracting electrodes 61 and the bottom electrode 8*b*, and the predetermined distance L1 is preferably 0.01 mm to 0.40 mm. Further, the length L2 of the non-overlapping part 8*d* in the X-axis direction is preferably 0.05 mm to 0.2 mm. As described above, since the non-overlapping part 8*d* exists at the end of the bottom face electrode 8*b* away from the extracting electrodes 61 with a predetermined length, the acid resistance and impact resistance of the terminal electrode 8 are sufficiently secured, and is possible to further reduce the contact resistance.

Figure 6:
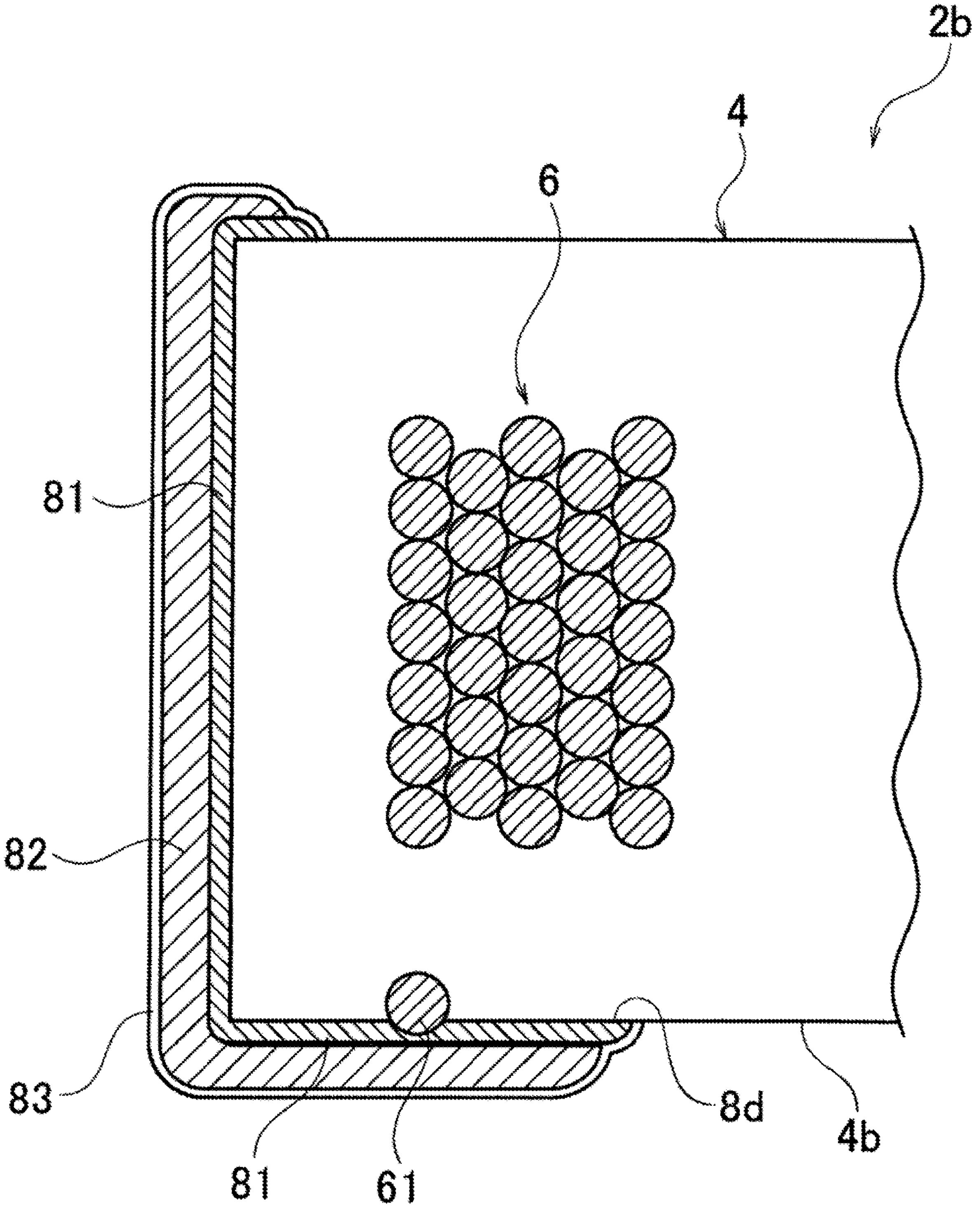
FIG. 6 is a schematic cross-sectional view showing a modified example of the coil device shown in FIG. 1.

Further, as shown in FIG. 6, the first electrode layer 81 may be formed not only on the bottom face electrode 8*b* but also on the end face electrode 8*a* and the wraparound part 8*c*. The first electrode layer 81 on the end face 4*a* may be formed with the same raw material as the first electrode layer 81 on the bottom face 4*b* side. The thickness of the first electrode layer 81 on the end face 4*a* can also be about the same as that of the bottom face 4*b*.

Figure 7:
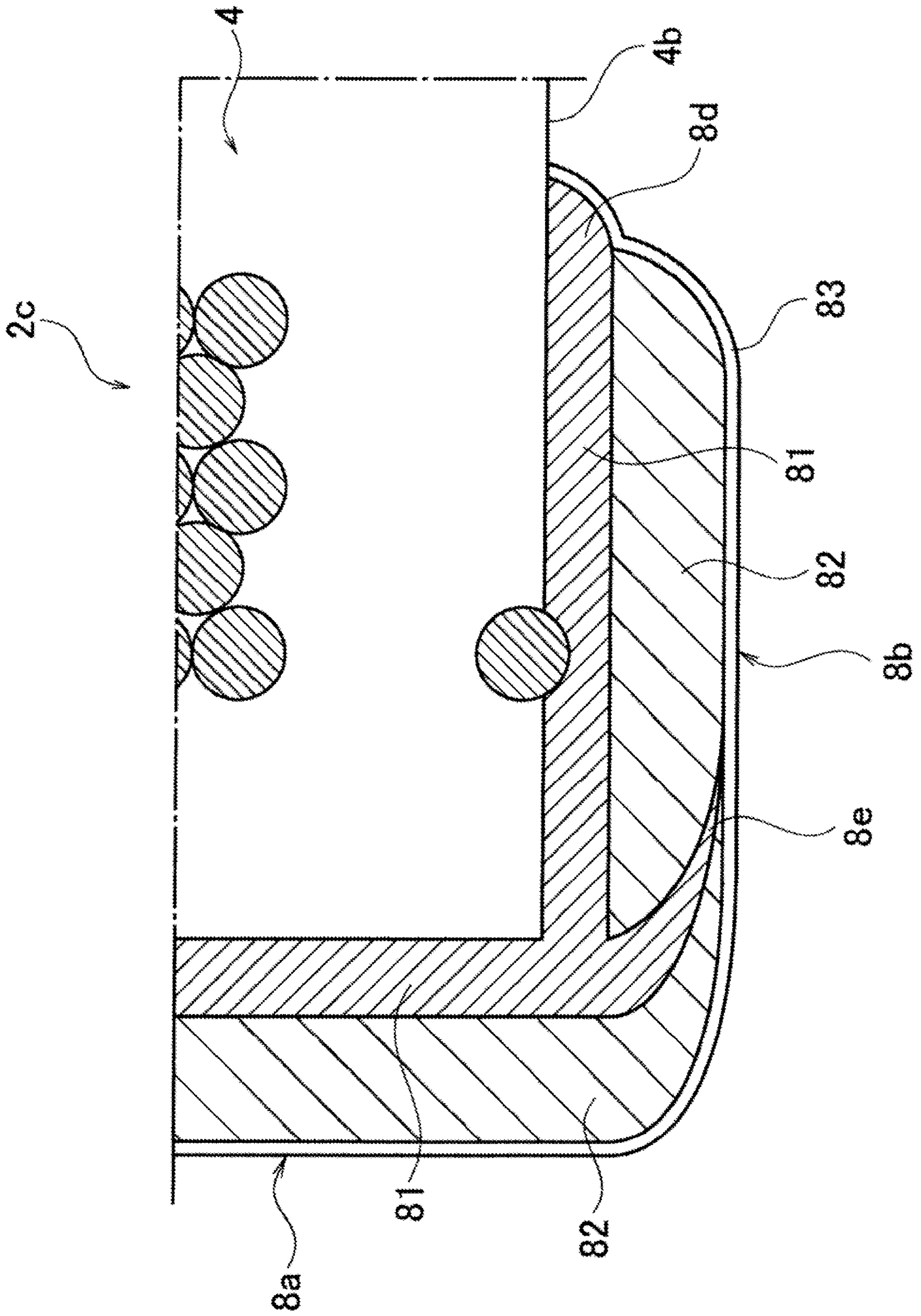
FIG. 7 is a schematic cross-sectional view showing a modified example of the coil device shown in FIG. 1.

Further, when the first electrode layer 81 is also formed on the end face 4*a*, the terminal electrode 8 may have a structure as shown in FIG. 7. In the inductor 2*c* shown in FIG. 7, a part of the first electrode layer 81 on the end face 4*a* side is partially extracted toward the outer surface side of the second electrode layer 82 at a connecting place between the end face electrode 8*a* and the bottom electrode 8*b*. In other words, the first electrode layer 81 on the end face 4*a* side is interposed between the second electrode layer 82 on the end face 4*a* side and the second electrode layer 82 on the bottom face 4*b* side.

In addition, in the inductor 2*c* shown in FIG. 7, a part of the first electrode layer 81 extracted to the outer surface side wraps around the outer surface of the second electrode layer 82 on the bottom face 4*b* side, and an overlapping part 8*e*, in which a part of the first electrode layer 81 is laminated on the outer surface of the second electrode layer 82, is formed. In the overlapping part 8*e*, the second electrode layer 82 on the end face 4*a* side may be further wrapped around and laminated on the outer side of the first electrode layer 81, which is wrapped around from the end face 4*a* side.

The structure having the overlapping part 8*e* as shown in FIG. 7 can be achieved by forming the first electrode layer 81 and the second electrode layer 82 of the bottom face electrode 8*b* with a printing method, and then forming the first electrode layer 81 and the second electrode layer 82 of the end face electrode 8*a* with a dipping method. That is, the raw material paste wraps around to the surface side of the bottom face electrode 8*b* when the end face electrode 8*a* is formed by dipping, forming the overlapping part 8*e*. In the case of such electrode forming method, terminal electrodes 8 can be efficiently formed at necessary places. That is, the inductor 2*c* having the structure shown in FIG. 7 can be efficiently manufactured and is suitable for a mass production.

In the inductor 2*c*, since the first electrode layer 81 having a low resistance value is extracted on the outer surface side of the terminal electrode 8 which is in contact with the bonding member 50 during the surface mounting, the resistance value of the terminal electrode 8 can be suppressed to a lower value. Further, a part of the first electrode layer 81 on the end face 4*a* side wraps around the bottom electrode part 8*b* to form the overlapping part 8*e*, so that the adhesion strength of the bottom electrode part 8*b* to the bottom face 4*b* is further improved. In addition, the bottom electrode part 8*b* becomes more difficult to peel off. As a result, the connection reliability of the terminal electrode 8 can be further improved.

As shown in FIG. 7, when the first electrode layer 81 having a low resistance value is partially extracted on the outer surface side of the terminal electrode 8, the content ratio of the resin 23 in the second electrode layer 82 is possible to make higher than that of the inductor 2 shown in FIG. 2. For example, in case of the second embodiment shown in FIG. 7, the content rate $A_R2$ (approximately R2) of the resin 23 can be 20% or more and 90% or less. Even when the content of the resin 23 is increased, the electrical properties of the terminal electrode 8 can be secured to a certain degree.

As described above, formed places of the first electrode layer 81 and the second electrode layer 82 are not limited to the embodiment shown in the first embodiment, and can be the second embodiments shown in FIGS. 5 to 7. In the inductors 2*a* to 2*c* shown in FIGS. 5 to 7, the first electrode layer 81 and the second electrode layer 82 having the same properties as those in the first embodiment are laminated at the bonding place with the extracting electrodes 61. Therefore, even in the case of these modified examples, the same effect as that of the first embodiment can be obtained.

Although embodiments of the present application have been described above, the present invention is not limited thereto, and various modifications can be made within the scope of the present invention.

For example, the coil 6*a* has a round wire 6 in FIGS. 2 to 7, however, the type of the wire 6 is not limited thereto, and the wire 6 may be a flat wire having a substantially rectangular cross-sectional shape. Alternatively, the wire 6 may be a square wire or a litz wire obtained by twisting thin wires. Further, the coil 6*a* may be formed by laminating conductive plate materials.

Further, in the above-described embodiment, the extracting electrodes 61 is present on the bottom face 4*b*, however, the extracting electrodes 61 may be formed on the end face 4*a*, the side face 4*d*, or may be present across multiple surfaces. In this case, the formation place of the terminal electrode 8 may be appropriately changed according to the formation place of the extracting electrodes 61.

Further, the preliminary green body 41 forming the element body 4 may be a sintered body of ferrite powder or metallic magnetic powder. In addition, the element body 4 itself may be made into a dust core of an FT type, an ET type, an EI type, a UU type, an EE type, an EER type, an UI type, a drum type, a toroidal type, a pot type, or a cup type. A coil may be wound around the dust core to form an inductor element. In this case, the wire 6 forming the extracting electrodes 61 does not have to be embedded inside the element body, and may be extracted along the outer circumference of the dust core and connected to the terminal electrode 8.

Further, the coil device according to the present application is not limited to the inductor, and may be a coil device such as a transformer, a choke coil, or a common mode filter, or a composite coil device including an inductor area and a capacitor area. Among these coil devices, the present disclosure is particularly suitable for coil devices, in which an insulating coated coil, resin, or the like is contained inside the element body.

EXPLANATION OF SYMBOLS

2 . . . Inductor
4 . . . Element body
4*a* . . . End face
4*b* . . . Bottom face
4*c* . . . Upper face
4*d* . . . Side face
41 . . . Preliminary green body
41*ax* . . . first flange
41*ay* . . . second flange
41*b* . . . Winding portion
41*c* . . . Cutout portion
6*a* . . . Coil
6 . . . Wire
6*a* . . . Wire body
6*b* . . . Insulating layer
61 . . . Extracting electrode
8 . . . Terminal electrode
8*a* . . . End face electrode
8*b* . . . Bottom face electrode
8*c* . . . Wraparound part
8*d* . . . Non-overlapping part
8*e* . . . Overlapping part
81 . . . First electrode layer
11 . . . Conductor powder (first electrode layer)

11*a* . . . First particles
11*b* . . . Second particles
13 . . . Resin (first electrode layer)
82 . . . Second electrode layer
20 . . . Outer resin electrode layer
21 . . . Conductor powder (second electrode layer)
23 . . . Resin (second electrode layer)
25 . . . Boundary line
83 . . . Outermost layer
50 . . . Bonding member
90 . . . Sealing material
100 . . . Substrate

What is claimed is:

1. A coil device comprising:

a core containing magnetic particles and a resin component;

a coil comprising a conductor having a coil shape; and a terminal electrode formed on a part of an outer surface of the core and electrically connected to an end of the conductor drawn from the coil; wherein the terminal electrode comprises a first electrode layer in contact with the end of the conductor and a second electrode layer located outside the first electrode layer, both the first electrode layer and the second electrode layer include conductive powder and resin, a content of the resin in the second electrode layer is higher than a content of the resin in the first electrode layer, an average thickness of the second electrode layer is thicker than an average thickness of the first electrode layer, and a non-overlapping part in which a part of the first electrode layer is not covered with the second electrode layer extends toward an end of the terminal electrode from a position which is away from a contact part of the conductor and the first electrode layer with a predetermined length, L1, in a first axis direction.

2. The coil device according to claim 1, wherein outer resin electrode layers are laminated in the second electrode layer.

3. The coil device according to claim 1, wherein a part of the first electrode layer is partially extracted toward an outer surface side of the second electrode.

4. The coil device according to claim 1, wherein a thickness of the first electrode layer is not constant and the thickness of the first electrode layer at a portion where a diameter of the conductor drawn from the coil is maximum is thinner.

5. The coil device according to claim 1, wherein the first electrode layer is in direct contact with the second electrode layer.

6. The coil device according to claim 1, wherein the conductive powder in the first electrode layer comprises metal nano-particles having a particle size of at least 100 nm or less and metal micro-particles having a particle size larger than the particle size of the metal nano-particles.

7. The coil device according to claim 6, wherein a thickness of the first electrode layer is not constant and the thickness of the first electrode layer at a portion where a diameter of the conductor drawn from the coil is maximum is thinner.

* * * * *